Nov. 6, 1923.
T. J. LITLE, JR
1,473,110
DUST GUARD FOR BEARINGS
Filed March 29, 1920
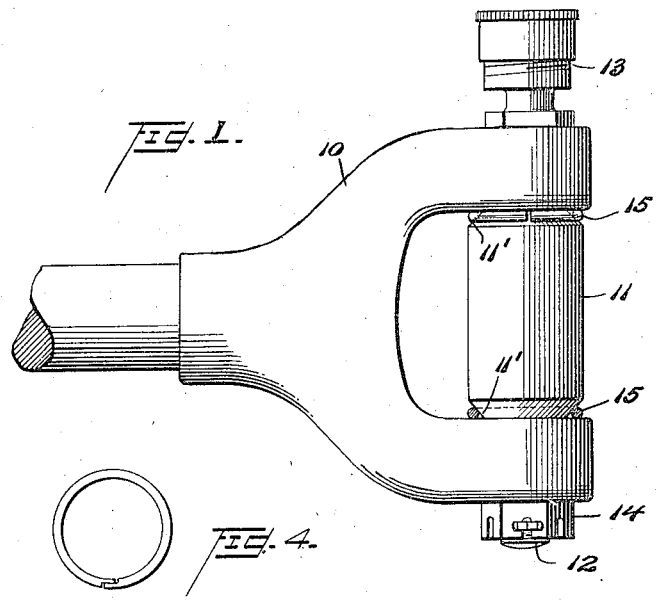
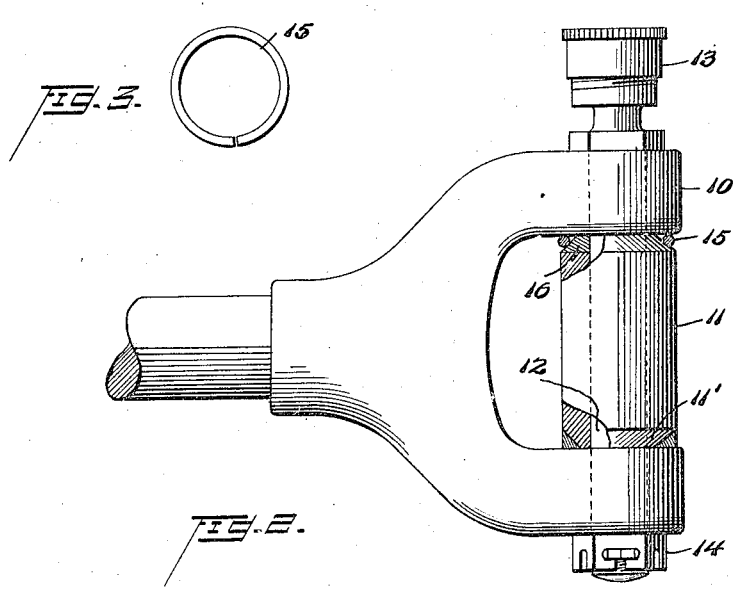

Patented Nov. 6, 1923.

1,473,110

UNITED STATES PATENT OFFICE.

THOMAS J. LITLE, JR., OF DETROIT, MICHIGAN, ASSIGNOR, BY MESNE ASSIGNMENTS, TO HAROLD H. EMMONS, OF DETROIT, MICHIGAN.

DUST GUARD FOR BEARINGS.

Application filed March 29, 1920. Serial No. 369,525.

*To all whom it may concern:*

Be it known that I, THOMAS J. LITLE, Jr., a citizen of the United States, and residing at Detroit, Wayne County, State of Michigan, have invented certain new and useful Improvements in Dust Guards for Bearings, of which the following is a specification.

The object of this invention is to provide a guard for preventing the entrance of dust, grit or chips into the joints between relatively rotatable machine parts. The invention is particularly useful in maintaining the wearing surfaces of journal bearings free from dirt, prolonging the life of the bearing and preserving its accuracy of movement, but it may also be used in protecting the wearing surfaces of thrust bearings, and in other ways.

Legitimate wear on well oiled and well protected bearing surfaces takes place very slowly, but where foreign matter is allowed to penetrate to the bearing surface, wear and scoring proceeds rapidly, a small quantity of grit or dust being sufficient to affect the operation of the bearing, and the general accuracy of the machine of which it forms a part, and continued use quickly ruining the same.

Certain machines are almost constantly enveloped in dust when in operation, such as machines located near grinders in factories, and motor vehicles travelling along roads. In motor vehicles there is a particular need for dust guards for the exposed bearings, which not only are constantly surrounded by clouds of dust and grit, but which are difficult to properly lubricate. The joint between the steering knuckle and steering connection rod is a good example of such an exposed joint and the improved dust guard will be illustrated and described in connection with such a joint, although it may be applied in different ways and to different forms of joints, as will be understood.

Fig. 1 of the drawings illustrates a front elevation of a joint between the steering knuckle and steering connection of a motor vehicle, showing two of the dust guards, one being in section;

Fig. 2 is a similar view but showing two different modifications of the dust guard applied thereto, portions of the joint and guards being shown in section;

Fig. 3 is a plan view of one form of dust guard; and

Fig. 4 is a similar view of a modified form.

The joint illustrated comprises two relatively rotatable coaxial members 10 and 11, the former being yoke shaped and having an axle 12 extending between the arms of the yoke on which the member 11 is journalled. A grease or oil cup 13 at the top of the joint is provided for the purpose of lubricating the bearing members and the usual castellated nut 14 threaded on the lower end of axle or pin 12, prevents accidental disassembling of the joint.

In the joint illustrated in Figure 1, the cylindrical member 11 has its edge beveled, at 11', and between the inclined surfaces of these bevelled portions and the adjacent plane surfaces of member 10 are located the dust excluding rings 15, 15. These rings are of resilient material and so constructed they tend to contract and wedge into the annular groove between the members 10 and 11 and to fit tightly against the sides of the grooves, so that the joints between the two members 10 and 11 are sealed against the passage of dust and grit which might ultimately penetrate to the bearing surfaces of member 11 and axle 12 to injure the same. Because of the contractile property of the springs, any wear taking place therein or in the walls of the grooves is compensated for by the contraction of the ring, which never becomes loose but maintains a tight fit at all times.

The ends of the ring may overlap, as illustrated in Figure 4, or may be separated by a narrow gap as illustrated in Figure 3, and the ring may have any desired cross section. In Figure 2 the lower ring is triangular in cross section while the upper ring is circular. In Figure 2 also the upper ring is located between the flat surface of member 10 and the annular inclined surface of a washer 16. The ring presses the washer tightly against the end of member 11 and at the same time prevents the entrance of dirt into the joint between member 10 and washer 16.

The rings are, of course, applied while the joint is being assembled and to replace one it is necessary to disassemble the joint, apply the ring and reassemble the parts. It is impossible for a ring to become lost after it has been placed in position.

From the above description the construction and utility of the invention will be apparent. The bearing is provided, at small expense and little trouble with permanent dust guards preventing foreign matter from injuring the bearing surfaces. The guards are not only self adjusting in the first instance, but adjust themselves from time to time, as wear occurs in the joint, to maintain a dust tight fit with its members. Obviously, the invention may be embodied in various forms and I do not, therefore, limit myself to the exact form shown and described.

Having thus described the invention what is claimed as new and desired to be secured by Letters Patent is:

1. In a motor vehicle, the combination with two connected chassis members supported for limited relative rotation about a common axis, one of said members having an annular surface facing toward the other member and inclined relatively to the adjacent surface of said other member, said surfaces forming the side walls of an outwardly facing circular groove between said members, and a contractile ring in said groove and bearing by its own resilience on the opposed surfaces of said member to prevent the entrance of dirt into the joint between said members.

2. In a motor vehicle, the combination with two connected chassis members supported for limited relative rotation about a common axis, one of said members having an annular surface facing toward the other member and inclined relatively to the adjacent surface of said other member, said surfaces forming the side walls of an outwardly facing circular groove between said members, and a contractile ring of circular cross section in said groove and bearing by its own resilience on the opposed surfaces of said members with each of which it makes contact in a circular line, to prevent the entrance of dirt into the joint between said members.

3. In a motor vehicle, the combination with two connected chassis members supported for limited relative rotation and having a circular groove between them and dust excluding means for said groove including a member lying in the groove and provided with an annular surface inclined to the oppositely facing surface of one of said members, and a contractile ring bearing against each of said oppositely facing and relatively inclined surfaces.

4. In a motor vehicle steering mechanism, the combination with the steering knuckle and connecting rod supported for limited relative rotation about a common axis and having a circular groove between them, and dust excluding means for said groove including two elements lying within the groove, one element having a surface inclined to the axis of rotation and the other element being a contractile ring bearing on said inclined surface and the adjacent oppositely facing surface of one of said members.

5. In a motor vehicle steering mechanism, the combination with the steering knuckle and connecting rod members connected for limited relative rotation about a common axis and having a circular groove between them, of dust excluding means for said groove including a washer of wedge-shaped cross section lying within the groove, and a contractile ring bearing against said washer and one of said members.

6. In a motor vehicle steering mechanism, the combination with the interconnected steering knuckle and connecting rod members relatively rotatable about a common axis and having a circular groove between them, of dust excluding means for said groove including two elements lying within the groove, one of which is a contractile ring bearing by its own resilience against one of said members and against said other element.

In testimony whereof I affix my signature.

THOMAS J. LITLE, Jr.